US011604729B2

(12) United States Patent
Pressler et al.

(10) Patent No.: US 11,604,729 B2
(45) Date of Patent: Mar. 14, 2023

(54) EFFICIENT CONTINUATION STACK STORAGE IN LANGUAGES WITH A GARBAGE COLLECTOR

(71) Applicant: Oracle International Corporation, Redwood Shores, CA (US)

(72) Inventors: Ron Pressler, London (GB); Erik Österlund, Västerhaninge (SE)

(73) Assignee: Oracle International Corporation, Redwood Shores, CA (US)

( * ) Notice: Subject to any disclaimer, the term of this patent is extended or adjusted under 35 U.S.C. 154(b) by 174 days.

(21) Appl. No.: 16/906,879

(22) Filed: Jun. 19, 2020

(65) Prior Publication Data
US 2021/0397549 A1    Dec. 23, 2021

(51) Int. Cl.
*G06F 12/02* (2006.01)
*G06F 9/48* (2006.01)
*G06F 12/08* (2016.01)

(52) U.S. Cl.
CPC ........ *G06F 12/0253* (2013.01); *G06F 9/4843* (2013.01); *G06F 12/0276* (2013.01); *G06F 12/08* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 2010/0114998 A1* | 5/2010 | Steensgaard | ........ | G06F 12/0269 707/813 |
| 2015/0378870 A1* | 12/2015 | Marron | ................. | G06F 11/362 717/128 |
| 2017/0177471 A1* | 6/2017 | Frazier | ................. | G06F 12/0253 |
| 2020/0125364 A1* | 4/2020 | Österlund | ........... | G06F 9/30058 |
| 2020/0310963 A1* | 10/2020 | Nilsen | ................. | G06F 9/5022 |
| 2021/0124608 A1* | 4/2021 | Shveidel | ............... | G06F 9/4881 |

OTHER PUBLICATIONS

Dorai et al., Control delimiters and their hierarchies, LISP and Symbolic Computation: An International Journal, vol. 3, 1990, pp. 67-99.
M. Felleisen et al., Beyond Continuations: Technical Report No. 216, Feb. 1987, 13 pages.

* cited by examiner

*Primary Examiner* — Jared I Rutz
*Assistant Examiner* — Marwan Ayash
(74) *Attorney, Agent, or Firm* — Invoke

(57) ABSTRACT

Techniques for efficient continuation stack storage are disclosed. In some embodiments, when a continuation yields, the continuation stack, or portion thereof, is copied from a thread stack to a data object, referred to herein as a chunk, allocated from memory. The copied stack portion may maintain the same representation in the chunk as on the thread stack to minimize processing overhead of the operation. When the continuation resumes, the continuation stack, or some portion thereof, is copied from the chunk to the thread stack. During execution, the continuation stack that was copied may be modified on the thread stack. When the continuation yields again, the runtime environment may determine, based at least in part on whether the first object in memory is subject to a garbage collection barrier, whether to copy the modified portion of the continuation stack to the existing chunk or to allocate a new chunk.

20 Claims, 9 Drawing Sheets

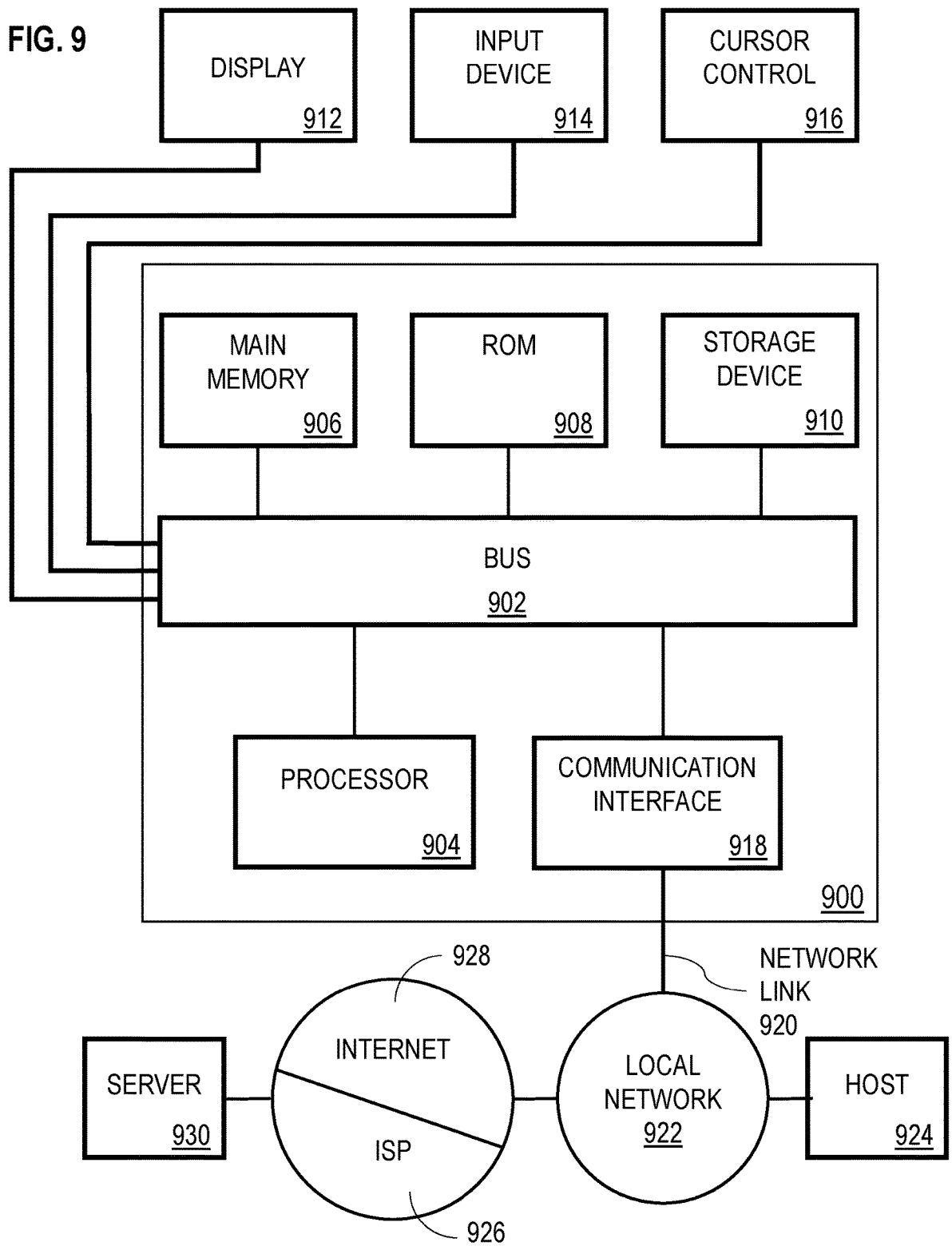

EFFICIENT CONTINUATION STACK STORAGE IN LANGUAGES WITH A GARBAGE COLLECTOR

TECHNICAL FIELD

The present disclosure relates, generally, to memory management in computing applications. In particular, the present disclosure relates to techniques for efficiently storing continuation stacks in garbage collection-enabled runtime environments.

BACKGROUND

Delimited continuations are a programming construct through which slices of an execution context for a program are captured. An example delimited continuation is a continuation stack, which stores a representation of an execution stack for a given thread of execution. Application runtime environments may mount and yield continuation stacks to switch between different tasks. When a continuation stack is mounted, the captured execution stack is loaded and executed. When the continuation stack is yielded, execution is suspended, and the current state of the execution stack is saved. Delimited continuations may be used for lightweight concurrent programming, allowing a runtime environment to run several more tasks in parallel than available physical processing cores.

Continuation stack management presents some challenges particular to programming languages with garbage collection (GC). GC-enabled runtime environments typically perform a stop-the-world (STW) pause to track the position of pointers on execution stacks. A STW pause prevents the pointers from being modified while the execution stacks are being scanned. When the number of execution stacks is relatively low, an STW pause may be performed quickly with negligible impact on application runtime performance. However, execution stacks captured by delimited continuations are generally managed separately from the thread stacks provided natively by the operating system (OS), meaning the number of runtime-managed, execution stacks may be much greater than the number of native OS threads. As a result, an STW pause may noticeably degrade runtime performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with one or more embodiments.

DETAILED DESCRIPTION

Figure 1:
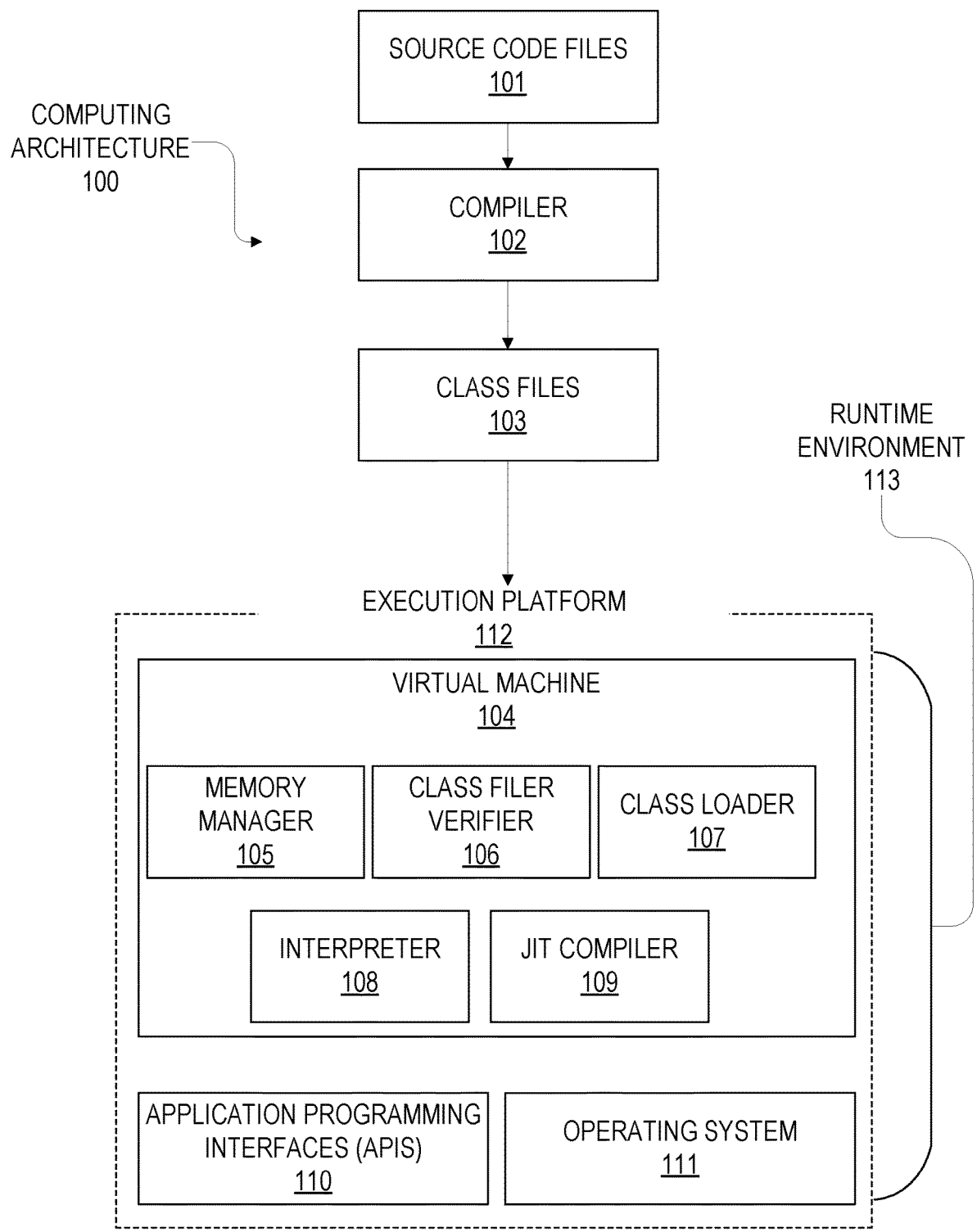
FIG. 1 illustrates an example computing architecture in which techniques described herein may be practiced in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. RUNTIME ENVIRONMENTS
    2.1 ARCHITECTURAL OVERVIEW
    2.2 EXAMPLE VIRTUAL MACHINE ARCHITECTURE
3. CONTINUATION CHUNKS
    3.1 YIELDING CONTINUATIONS AND CHUNK MANAGEMENT
    3.2 RESUMING CONTINUATIONS FROM STORED CHUNKS
    3.3 PROMOTING CHUNKS
    3.4 AGE-NEUTRAL CHUNK MANAGEMENT
4. GARBAGE COLLECTION INVOLVING CONTINUATION CHUNKS
5. COMPUTER NETWORKS AND CLOUD NETWORKS
6. HARDWARE IMPLEMENTATIONS
7. MISCELLANEOUS; EXTENSIONS 1. General Overview Techniques are described herein for efficient continuation stack storage and management in languages with garbage collection. One approach for mitigating the impact of an STW pause in the presence of a large number of continuation stacks is to translate the representation of the execution stack into one that may be scanned by a garbage collector while the program is still running. According to this approach, prior to suspension of a continuation, the thread stack used by the continuation is scanned to extract pointers for the current execution context. The pointers may then be stored in a data structure, such as a pointer array, which allows the garbage collector to quickly identify the pointers in the suspended execution stacks without performing an STW pause. Thus, the garbage collector may limit the scan to execution stacks of currently mounted continuations during an STW pause, greatly reducing the performance impact incurred from stopping program execution during GC operations. However, a tradeoff with this approach is that switching times between different continuation stacks may be negatively impacted due to the cost of translating the execution stack representation each time a continuation is yielded.

Techniques described herein allow for GC-enabled runtime environments to avoid translation costs associated with changing the representation of suspended continuation stacks without requiring an STW pause to track the position of pointers across all continuation stacks. Thus, the techniques allow for fast switching between continuation stacks with low negative impact on GC operations.

In some embodiments, continuation stacks are stored in data objects, referred to herein as chunks. During a continuation's execution, the corresponding continuation stack may make use of a native operating system thread stack. When a continuation first yields, the execution stack, or a portion thereof, that resides on the thread stack is copied to an allocated chunk and removed from the thread stack. The chunk may store the continuation stack or portion thereof in the same representation that it has on the thread stack, thereby avoiding processing overhead associated with translating the execution stack to a different structured representation.

When a continuation is mounted, the continuation stack or portion thereof may also be directly copied from a chunk to the thread stack without any translation costs. As execution of the continuation resumes, the continuation stack may be modified. When the continuation yields again, the runtime environment may determine whether to copy the modified stack or some portion thereof back to the chunk based at least in part on whether the chunk is subject to a garbage collection barrier. If the chunk is in an area of memory that is not subject to a GC barrier and there is room for the modified stack portion, then the stack portion may be copied into the chunk, thereby mutating the chunk. If the chunk is in an area of memory that is subject to a GC barrier or does not have sufficient room, then the runtime environment may allocate a new chunk into which the updated stack portion is copied.

In some embodiments, chunks are subject to garbage collection barriers based at least in part on their age. Concurrent and generational garbage collectors generally do not require any GC barriers for newly allocated data objects since the majority of data objects tend to be short-lived. These objects may be allocated within a region of memory sometimes referred to as the young generation. The oldest objects in this region of memory that are still live may then be promoted and/or moved to another memory region, referred to as the tenured generation. Once promoted, the positions of pointers within the chunk are frozen. Existing pointers within the chunk may be deleted from the chunk when frozen; however, a GC write barrier may prevent attempts to overwrite the pointers with other datatypes or otherwise move the position of the pointers. The write barrier may be strictly applied to chunks that have aged out of the young generation. Thus, pointers within the young generation are not subject to the write barrier and may be overwritten or otherwise mutated.

During a GC-triggered STW pause, the runtime environment may limit scanning of continuation stacks to chunks that reside in memory area(s) that are not subject to GC barriers and stack portions copied to the thread stack. Concurrent and generational garbage collectors generally do not require any GC barriers for newly allocated data objects and scan these objects during an STW pause. Therefore, tracking the position of pointers for young chunks during an STW pause may be done with little or no performance impact. Scanning of promoted, aged-out chunks or chunks in memory areas that are otherwise not subject to any GC barriers may be performed outside of an STW pause as the program is executing since the position of the pointers in these chunks is frozen. Thus, the number of continuation stacks that are scanned for a given STW pause may be significantly reduced.

One or more embodiments described in this Specification and/or recited in the claims may not be included in this General Overview section.

2. Runtime Environments

2.1 Architectural Overview

In some embodiments, the techniques described herein for allocating and managing chunks are executed within a runtime environment. A runtime environment in this context may include supporting code, tools and/or other hardware/software components that implement a program's execution. One or more components of the runtime environment may vary depending on the programming language of the program's source code, the hardware platform on which the program is executed, the operating system version, and/or other system attributes.

FIG. 1 illustrates an example computing architecture in which techniques described herein may be practiced. Software and/or hardware components described with relation to the example architecture may be omitted or associated with a different set of functionality than described herein. Software and/or hardware components, not described herein, may be used within an environment in accordance with some embodiments. Accordingly, the example environment should not be constructed as limiting the scope of any of the claims.

As illustrated in FIG. 1, computing architecture 100 includes source code files 101 which are compiled by compiler 102 into blueprints representing the program to be executed. Examples of the blueprints include class files 103, which may be loaded and executed by execution platform 112. Execution platform 112 includes runtime environment 113, operating system 111, and one or more application programming interfaces (APIs) 110 that enable communication between runtime environment 113 and operating system 111. Runtime environment 113 includes virtual machine 104 comprising various components, such as memory manager 105 (which may include a garbage collector), class file verifier 106 to check the validity of class files 103, class loader 107 to locate and build in-memory representations of classes, interpreter 108 for executing virtual machine code, and just-in-time (JIT) compiler 109 for producing optimized machine-level code.

In some embodiments, computing architecture 100 includes source code files 101 that contain code written in a particular programming language, such as Java, C, C++, C#, Ruby, Perl, and so forth. Thus, source code files 101 adhere to a particular set of syntactic and/or semantic rules for the associated language. For example, code written in Java adheres to the Java Language Specification. However, since specifications are updated and revised over time, source code files 101 may be associated with a version number indicating the revision of the specification to which source code files 101 adhere. One or more of source code files 101 may be written in a programming language supported by automatic garbage collection.

In various embodiments, compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by virtual machine 104 that is capable of running on top of a variety of particular machine environments. The virtual machine instructions are executable by virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which virtual machine 104 resides.

In some embodiments, virtual machine 104 includes interpreter 108 and a JIT compiler 109 (or a component implementing aspects of both), and executes programs using a combination of interpreted and compiled techniques. For example, virtual machine 104 may initially begin by interpreting the virtual machine instructions representing the program via the interpreter 108 while tracking statistics related to program behavior, such as how often different sections or blocks of code are executed by virtual machine 104. Once a block of code surpass a threshold (is "hot"), virtual machine 104 may invoke JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In other embodiments, runtime environment 113 may not include a virtual machine. For example, some static and stack-based environments do not execute programs using a virtual machine. A runtime environment may include supporting code, tools and/or other hardware/software components that implement a given program's execution. One or more components of the runtime environment may vary depending on the programming language of the source code, the hardware platform on which the program is executed, and/or the operating system version.

Source code files 101 have been illustrated as the "top level" representation of the program to be executed by execution platform 111. Although computing architecture 100 depicts source code files 101 as a "top level" program representation, in other embodiments source code files 101 may be an intermediate representation received via a "higher level" compiler that processed code files in a different language into the language of source code files 101.

In some embodiments, compiler 102 receives as input the source code files 101 and converts the source code files 101 into class files 103 that are in a format expected by virtual machine 104. For example, in the context of the JVM, the Java Virtual Machine Specification defines a particular class file format to which class files 103 are expected to adhere. In some embodiments, class files 103 contain the virtual machine instructions that have been converted from source code files 101. However, in other embodiments, class files 103 may contain other structures as well, such as tables identifying constant values and/or metadata related to various structures (classes, fields, methods, and so forth).

2.2 Example Virtual Machine Architecture

Figure 2:
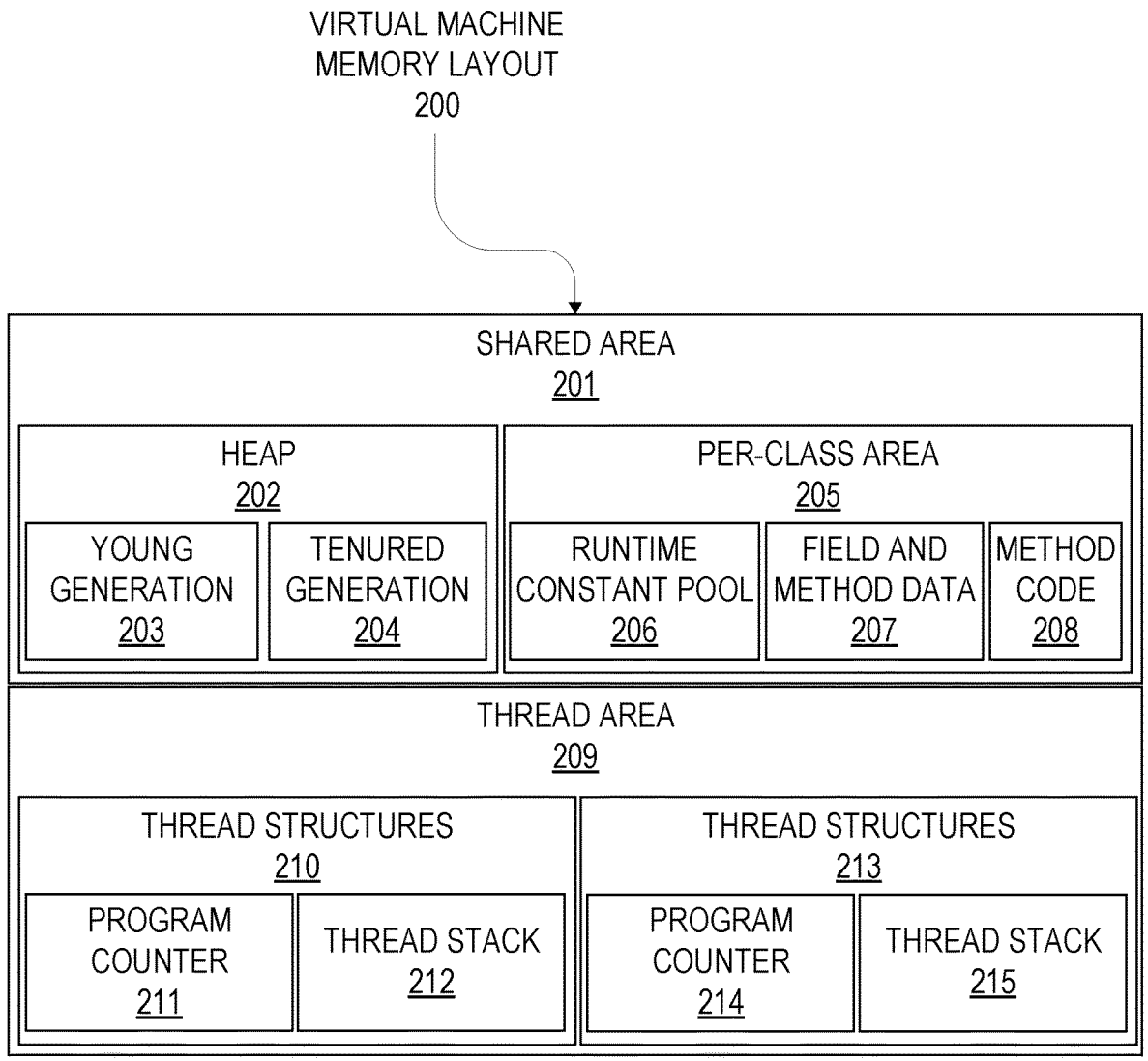
FIG. 2 illustrates an example virtual machine memory layout according to some embodiments.

FIG. 2 illustrates example virtual machine memory layout 200 according to some embodiments. Virtual machine 104 may adhere to the virtual machine memory layout 200 depicted in FIG. 2. In other embodiments, the memory layout of virtual machine 104 may vary, such as by including additional components and/or omitting one or more of the depicted components, depending on the runtime environment. Although components of the virtual machine memory layout 200 may be referred to as memory "areas", there is no requirement that the memory areas are physically contiguous.

In the example illustrated by FIG. 2, virtual machine memory layout 200 is divided into shared area 201 and thread area 209. Shared area 201 represents an area in memory where structures shared among the various threads executing on virtual machine 104 are stored. Shared area 201 includes heap 202 and per-class area 205.

Heap 202 represents an area of memory allocated on behalf of a program during execution of the program. In some embodiments, heap 202 includes young generation 203 and tenured generation 204. Young generation 203 may correspond to regions of the heap that stores newly created objects during program execution. When young generation 203 is filled, the oldest objects are promoted to tenured generation 204 to free up space for new objects in young generation 203. Promoting an object may comprise moving to a different region and/or reclassifying the data objects.

Separate treatment of different generations of objects may facilitate generational garbage collection. Generally, most objects have a short lifecycle during program execution. Thus, performing garbage collection more frequently on objects stored in young generation 203 may optimize the amount of space that may be reclaimed for a given scan. Continuation chunks may also be processed differently based on the generation where the chunk is stored. Although only two generations are depicted, in other embodiments, heap 202 may include other age-related generations, such as a permanent generation.

In some embodiments, young generation 203 is not subject to any GC barriers. Stated another way, the garbage collector does not restrict objects within this region of memory from being mutated. In contrast, GC barriers may be applied to tenured generation 204 to maintain the position of pointers within the data objects. In addition or as an alternative to young generation 203 and tenured generation 204, heap 202 may organize data objects into other memory areas in a manner that is not age-based. For example, data objects may be stored in different regions based on datatype, size, and/or other object attributes. Some regions that are not age-based may be subject to GC barriers while other regions may not be subject to GC barriers. Thus, the in-memory organization of data objects may vary depending on the implementation.

Per-class area 205 represents the memory area where the data pertaining to the individual classes are stored. In some embodiments, per-class area 205 includes, for each loaded class, run-time constant pool 206 representing data from a constant table of the class, field and method data 207 (for example, to hold the static fields of the class), and the method code 208 representing the virtual machine instructions for methods of the class.

Thread area 209 represents a memory area where structures specific to individual threads are stored. In FIG. 2, thread area 209 includes thread structures 210 and thread structures 213, representing the per-thread structures utilized by different threads. In order to provide clear examples, thread area 209 depicted in FIG. 2 assumes two threads are executing on the virtual machine 104. However, in a practical environment, virtual machine 104 may execute any arbitrary number of threads, with the number of thread structures scaled accordingly.

In some embodiments, thread structures 210 includes program counter 211 and thread stack 212. Similarly, thread structures 213 includes program counter 214 and thread stack 215.

In some embodiments, program counter 211 and program counter 214 store the current address of the virtual machine instruction being executed by their respective threads. Thus, as a thread steps through the instructions, the program counters are updated to maintain an index to the current instruction.

In some embodiments, thread stack 212 and thread stack 215 each store stack frames for their respective threads, where each stack frame holds local variables for a function. A frame is a data structure that may be used to store data and partial results, return values for methods, and/or perform dynamic linking. A new frame is created each time a method is invoked. A frame is destroyed when the method that caused the frame to be generated completes. Thus, when a thread performs a method invocation, virtual machine 104 generates a new frame and pushes the frame onto the virtual machine stack associated with the thread.

When a method invocation completes, virtual machine 104 passes back the result of the method invocation to the previous frame and pops the current frame off of the stack. In some embodiments, for a given thread, one frame is active at any point. This active frame is referred to as the current frame, the method that caused generation of the current frame is referred to as the current method, and the class to which the current method belongs is referred to as the current class.

Thread stack 212 and thread stack 215 may correspond to native operating system stacks or virtual thread stacks. Generally, the number of virtual threads and continuations executing on a machine is much greater than the number of native threads. Continuations are generally much lighter weight and require less compute-intensive operations than native threads, as the continuations may leverage the native thread structures when mounted and executed.

Figure 3:
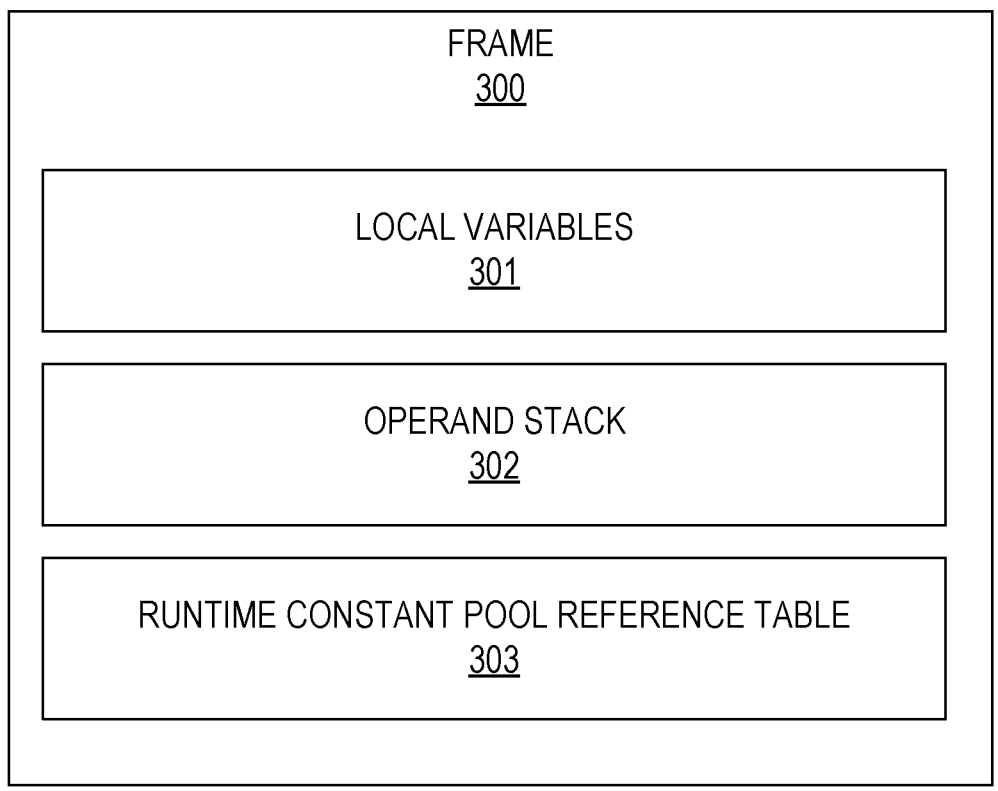
FIG. 3 illustrates an example frame layout according to some embodiments.

FIG. 3 illustrates an example frame layout according to some embodiments. In some embodiments, frames of a thread stack, such as thread stack 212 and thread stack 215 adhere to the structure of frame 300.

In some embodiments, frame 300 includes local variables 301, operand stack 302, and run-time constant pool reference table 303. In some embodiments, local variables 301 are represented as an array of variables that each hold a value, for example, boolean, byte, char, short, int, float, or reference. Further, some value types, such as longs or doubles, may be represented by more than one entry in the array. The local variables 301 are used to pass parameters on method invocations and store partial results. For example, when generating the frame 300 in response to invoking a method, the parameters may be stored in predefined positions within the local variables 301, such as indexes 1-N corresponding to the first to Nth parameters in the invocation. The parameters may include pointers and other references.

In some embodiments, the operand stack 302 is empty by default when the frame 300 is created by the virtual machine 104. The virtual machine 104 then supplies instructions from the method code 208 of the current method to load constants or values from the local variables 301 onto the operand stack 302. Other instructions take operands from the operand stack 302, operate on them, and push the result back onto the operand stack 302. Furthermore, the operand stack 302 is used to prepare parameters to be passed to methods and to receive method results. For example, the parameters of the method being invoked could be pushed onto the operand stack 302 prior to issuing the invocation to the method. The virtual machine 104 then generates a e 111 new frame for the method invocation where the operands on the operand stack 302 of the previous frame are popped and loaded into the local variables 301 of the new frame. When the invoked method terminates, the new frame is popped from the virtual machine stack and the return value is pushed onto the operand stack 302 of the previous frame.

In some embodiments, run-time constant pool reference table 303 contains a reference to the run-time constant pool of the current class (e.g., runtime constant pool 206). Run-time constant pool reference table 303 is used to support resolution. Resolution is the process whereby symbolic references in the constant pool are translated into concrete memory addresses, loading classes to resolve as-yet-undefined symbols and translating variable accesses into appropriate offsets into storage structures associated with the run-time location of these variables.

3. Continuation Chunks 3.1 Yielding Continuations and Chunk Management

During application runtime, continuations may be mounted to native threads and yielded at various points in time. A scheduler or some other programmatic means may be used to select which continuations are mounted and which continuations are yielded. At a given moment, multiple continuations may be mounted to different threads stacks and executed concurrently by different central processing unit (CPU) cores, while another set of continuations are in a suspended state. In some cases, the number of continuations that have been yielded may be much larger than the currently mounted continuations.

When a continuation yields, runtime environment 113 may capture the execution context associated with the continuation such that the continuation may be resumed at a later time. The execution context includes the execution stack for the continuation, also referred to herein as the continuation stack. At the moment a yield is initiated, all or a portion of the continuation stack may reside on a native thread stack for the thread to which the continuation is mounted. The continuation stack or portion thereof that is on the thread stack may be stored in one or more chunk data objects, which may be managed based in part on age, as described further herein. The continuation stack or portion thereof may then be removed from the thread stack to allow the thread to be used by other continuations or jobs.

Figure 4:
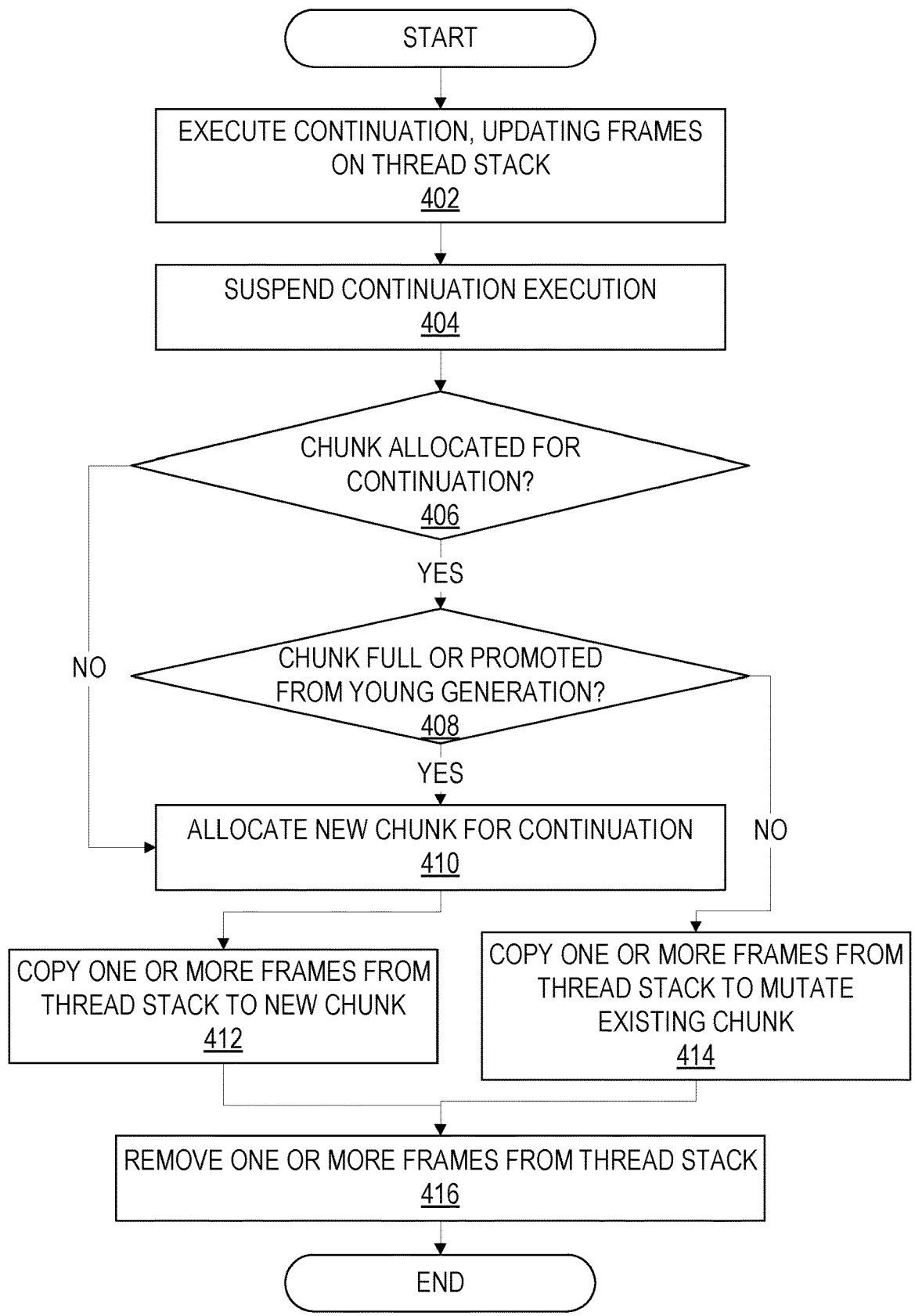
FIG. 4 illustrates an example set of operations for chunk management upon a continuation yield in accordance with some embodiments.

FIG. 4 illustrates an example set of operations for chunk management upon a continuation yield in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, runtime environment 113 executes a continuation, updating frames on the thread stack (operation 402). For example, a new frame may be created when method code in a continuation is invoked and destroyed when the method code that caused the frame to be generated completes. Method code within the continuation may further update local variables (e.g., local pointers, arrays, and/or other datatypes) and/or other data within a stack frame.

Thus, during continuation execution, one or more frames of the continuation stack may be pushed, popped, and/or mutated.

Runtime environment 113 next suspends execution of the continuation (operation 404). Suspension may be triggered at a scheduled time, at a certain point in the execution of the continuation code, to make the thread available for a higher priority job, or based on some other event.

Once execution is suspended, runtime environment 113 determines whether a chunk has been allocated for the continuation (operation 406). The first time a continuation yields, there may be no existing chunks for the continuation. In this case, runtime environment allocates a new chunk for the continuation from heap 202 (operation 410). The size of a chunk may vary depending on the particular implementation.

If the continuation has previously yielded and been remounted, then one or more chunks may already exist for the continuation. In this case, runtime environment 113 determines whether the most recently allocated chunk for the continuation is full or has been promoted from young generation 203 (operation 408).

If the chunk is full or has aged out of young generation 203, then runtime environment 113 allocates a new chunk for the continuation from heap 202 (operation 410). The new chunk may be allocated even if an aged-out chunk is not full as write barriers may prevent the aged-out chunk from being mutated. In some embodiments, new chunks are allocated within young generation 203 and not subject to the same write barriers as the aged-out chunks.

When a new chunk is allocated, runtime environment 113 copies one or more frames from the thread stack to the new chunk (operation 412). In some embodiments, the frames are directly copied, maintaining the same data structure of the frames as they exist on the thread stack. By maintaining the same representation, processing overhead incurred from translating the frames to a new representation may be avoided. In particular, the copying may be done without extracting pointers from the frames and placing the pointers in a pointer array.

In the case where there is an existing continuation chunk that is not full and has not aged out of young generation 203, runtime environment 113 copies the one or more frames from the thread stack to the existing chunk, thereby mutating the existing chunk (operation 414). In some cases, the position of pointers and/or other local variables may be moved to a different location within the frame. In other cases, the pointers within the frame may be overwritten or deleted. Additionally or alternatively, one or more frames may have been added (pushed) and/or removed (popped) from the continuation stack. Thus, the mutated version of the chunk may store a different set of frames and the composition/shape of individual frames may vary from the previous version of the chunk.

Once the one or more frames have been copied from the thread stack to the chunk, runtime environment 113 removes these frames from the thread stack (operation 416). The thread stack may then be used to execute a different continuation or pick up another job.

Figure 5:
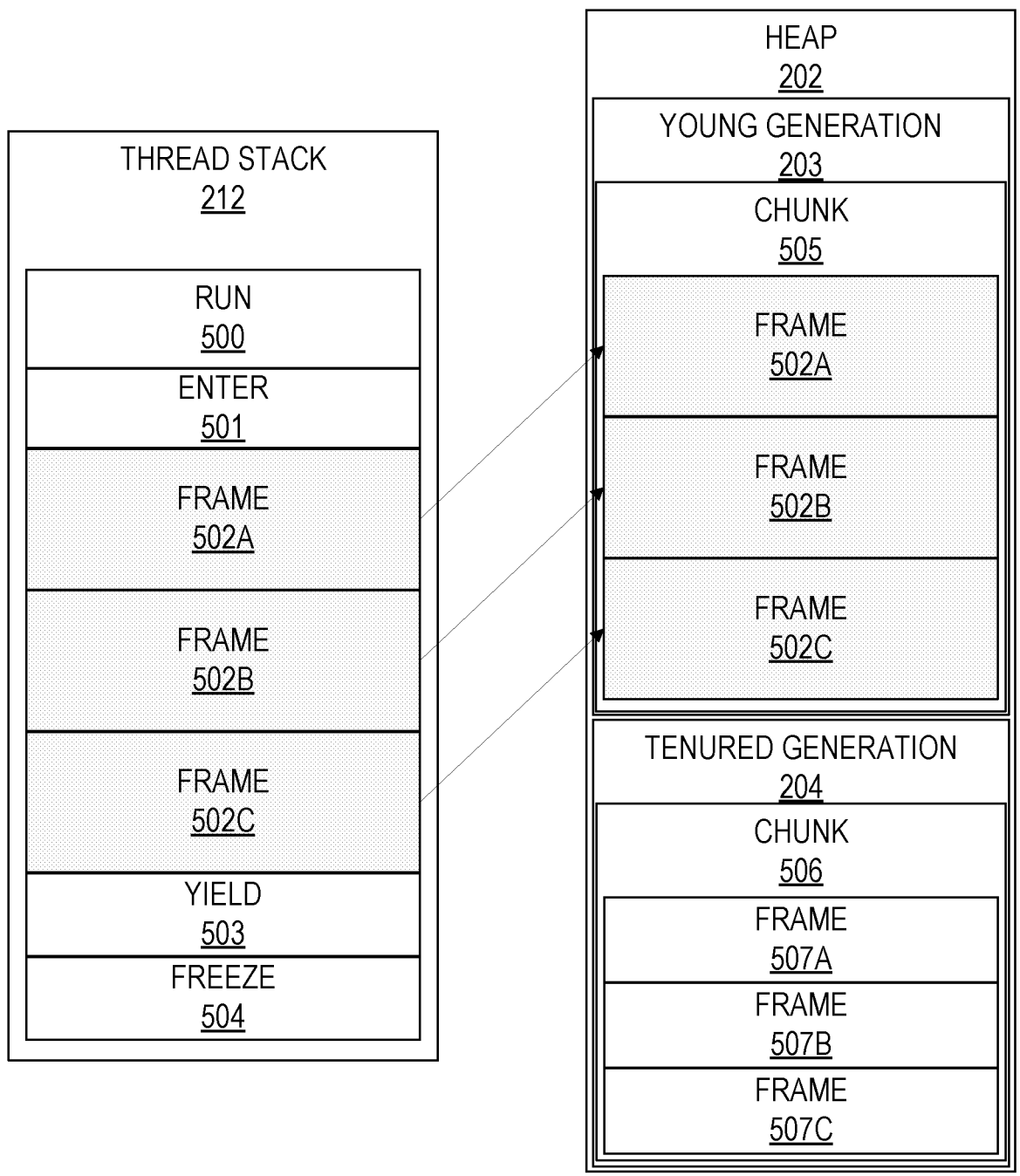
FIG. 5 illustrates an example memory layout upon a continuation yield in accordance with some embodiments.

FIG. 5 illustrates an example memory layout upon a continuation yield in accordance with some embodiments. In the example illustrated, thread stack 212 stores a set of frames that have been pushed during execution of a continuation. At the top of the stack, run 500 and enter 501 indicate that the continuation has started execution. In the present example, three frames (frame 502A, frame 502B, and frame 502C) are stored on thread stack 212. For example, during execution, function A may call function B, which calls function C. The invocation of each function cause frame 502A, frame 502B, and frame 502C, respectively, to be pushed to thread stack 212. The continuation is then suspended as indicated by yield 503 and freeze 504.

Once suspended, frame 502A, frame 502B, and frame 502C are copied to chunk 505, which is allocated from young generation 203 in heap 202. Chunk 506 has been promoted to tenured generation 204 and stores frame 507A, frame 507B, and frame 507C, which may be for the same or a different continuation. Although only one chunk is depicted for each of young generation 203 and tenured generation 204, there may be several chunks in each region of memory.

3.2 Resuming Continuations from Stored Chunks

Figure 6:
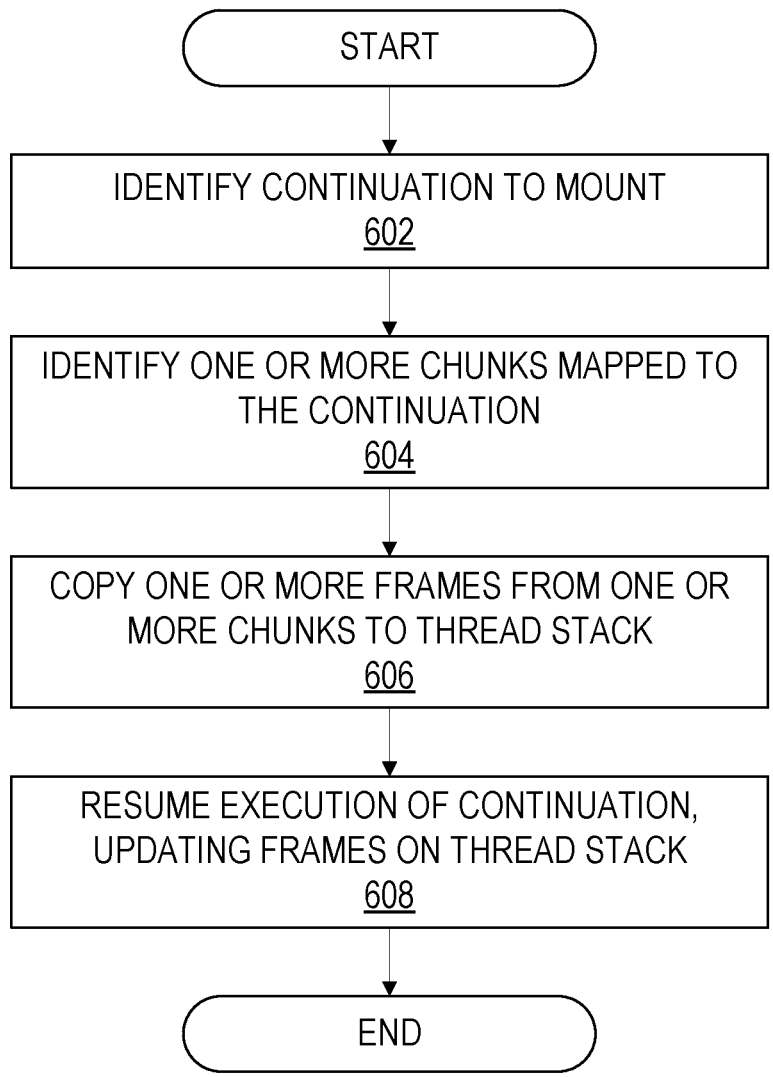
FIG. 6 illustrates an example set of operations for resuming execution of a continuation in accordance with some embodiments.

In some embodiments, the chunks that are stored for a given continuation are used to resume execution of the continuation. FIG. 6 illustrates an example set of operations for resuming execution of a continuation in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

Referring to FIG. 6, runtime environment 113 identifies a continuation to mount (operation 602). As previously mentioned, a scheduler may be used to control when continuations are mounted and yielded. In some embodiments, runtime environment 113 may suspend another continuation per the operations described in FIG. 4 to free up a thread for a continuation that is scheduled for execution.

Runtime environment 113 further identifies one or more chunks mapped to the continuation (operation 604). In some embodiments, the scheduler maintains a mapping between continuations and chunks. For example, the mapping may include a list of continuation identifiers. Each continuation identifier may be linked or otherwise associated with one or more chunk identifiers, which may be a pointer to a memory location, such as the starting address, where the chunk is stored in heap 202.

In some embodiments, runtime environment 113 identifies the most recently allocated chunk for the continuation during operation 604. The most recently allocated chunk generally includes frames from the most recently invoked methods within the continuation code. Other continuation chunks may be ignored since the entire continuation stack does not need to be copied to the thread stack to resume execution. Thus, chunk processing may be reduced to a subset of one or more of the most recent chunks that have been allocated for the continuation.

Runtime environment 113 next copies one or more frames from one or more of the identified continuation chunks to the thread stack (operation 606). For example, referring to FIG. 5, frame 502A, frame 502B, and frame 502C may be copied back to thread stack 212 to resume execution of the continuation. In other cases, only a subset of the frames within a chunk may be copied back. For instance, only frame 502C, or only frame 502B and frame 502C may be copied back to thread stack 212 from chunk 505.

Referring again to FIG. 6, runtime environment 113 further resumes execution of the continuation, updating frames on the thread stack (operation 608). Frames on the thread stack may be added, removed, and/or mutated depending on the continuation code that is executed. In some cases, runtime environment 113 may load more frames onto the thread stack from one or more chunks during continuation runtime. For example, if only frame 502C has been loaded, and the frame is popped during execution, then runtime environment 113 may copy frame 502B to the thread stack. The method that caused the creation of frame 502B may then call another method, pushing a new frame onto the stack. Thus, continuation stack may change significantly as a continuation is executed.

Once the continuation yields again, runtime environment 113 may execute the set of operations depicted in FIG. 4. Thus, the updated set of frames or some portion thereof may be copied to a newly allocated chunk and/or an existing chunk in younger generation 203, potentially mutating the existing chunk.

3.3 Promoting Chunks

In some embodiments, chunks are promoted from young generation 203 based at least in part on age. Once a chunk has been aged out, the position of the pointers within the chunk may be frozen, preserving the shape of the chunk, which allows garbage collection to be run on the chunks outside of an STW pause.

Figure 7:
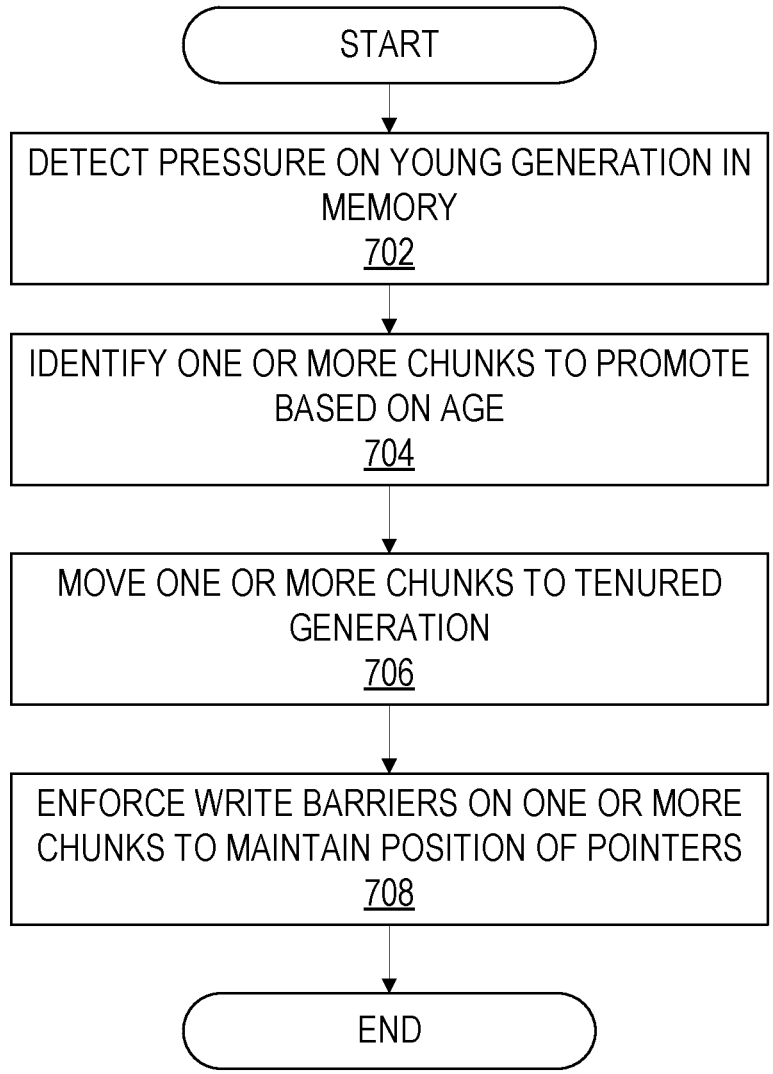
FIG. 7 illustrates an example set of operations for promoting a chunk in accordance with some embodiments.

FIG. 7 illustrates an example set of operations for promoting a chunk in accordance with some embodiments. One or more operations illustrated in FIG. 7 may be modified, rearranged, or omitted all together. Accordingly, the particular sequence of operations illustrated in FIG. 7 should not be construed as limiting the scope of one or more embodiments.

Referring to FIG. 7, runtime environment 113 detects memory pressure on young generation 203 (operation 702). Memory pressure may exist when the amount of available space is less than a threshold or, conversely, when the amount of consumed space exceeds a threshold. The amount of memory allocated for young generation 203 and the thresholds for aging out objects may vary depending on the particular implementation.

Responsive to detecting the memory pressure, runtime environment 113 identifies one or more objects to promote based on age (operation 704). For example, runtime environment 113 may identify the top n oldest chunks or any chunks that are older than a threshold age. Each chunk may be associated with a timestamp that indicates the age of the chunk. Runtime environment 113 may scan the timestamps to identify the oldest chunks in younger generation 203.

Runtime environment 113 next moves the identified one or more chunks to tenured generation 204 (operation 706). In some embodiments, the one or more chunks may be physically moved to a different region in memory. In other embodiments, moving the chunks to tenured region 204 does not physically move the chunks but rather reclassifies the chunks. For example, chunk metadata may be updated to indicate that the chunk is no longer part of young generation 203.

Runtime environment 113 further enforces write barriers on the aged-out chunks to preserve the position of pointers within the stack frames stored in the chunk (operation 708). A write barrier may be implemented as a GC barrier, which comprises code that programmatically enforces the write constraints. For example, the barrier may be emitted before every move of a chunk to tenured generation 204 to ensure that the position of the pointers is maintained within the chunk.

It is noted that frames within a chunk that has aged out of young generation 203 may be copied to a thread stack and thereby mutated. In this case, the mutated frames may be copied to a newly allocated chunk or a different chunk in young generation 203. Pointers may be deleted from a chunk in tenured generation 204; however, the position of the pointers may still be maintained.

In some embodiments, chunks that are promoted may be translated into a representation that may be more quickly processed by a garbage collector. For example, the pointers in the chunk may be extracted and placed into a pointer array. The translation in this context occurs during promotion rather than continuation yield. Thus, the speed of switching between continuations may not be negatively impacted. However, in other embodiments, promoted chunks may maintain the same representation as before promotion. Pointer extraction may then be performed at the time of garbage collection.

3.4 Age-Neutral Chunk Management

In some embodiments, chunks may be stored in memory areas and/or promoted based on factors other than age. As previously mentioned, objects may be stored in memory areas based on datatype, object size, and/or other object attributes. In these cases, age may not factor into the determination of whether or not to allocate a new chunk when a continuation yields. Rather, the determination may depend on whether the memory area storing an existing chunk is subject to a GC barrier. For example, a first memory area may not be subject to any GC barriers and store data objects below a certain size threshold. A second memory area that is subject to a GC write barrier may store data objects that are above the size threshold. In this case, if the chunk resides in the first memory area, then it may be mutated with updated frames when the continuation yields. If the chunk instead resides in the second memory area, then a new chunk may be allocated to store the updated portion of the continuation stack. Similarly, these techniques may be applied to other regions in memory as a function of which regions are subject to GC barriers.

4. Garbage Collection Involving Continuation Chunks

Garbage collection techniques may vary significantly depending on the programming language and runtime environment. Generally, garbage collectors identify objects that are no longer reachable by a chain of references from root objects, signifying that the objects are no longer in use by the program. The garbage collector may then reclaim memory consumed by these objects to free up space for other objects.

Many garbage collectors, including concurrent and incremental garbage collectors, perform an STW pause to locate pointers in the root objects. Once located, the program may be resumed, and the live objects may be marked by tracing the reference pointers located in the root objects. These approaches work well when there are a small number of root objects. However, continuation stacks may be treated as root objects and may vastly outnumber the number of native thread stacks. As previously noted, scanning a large number of continuation stacks during an STW pause may degrade application runtime performance beyond acceptable limits.

With the chunk management techniques described above, garbage collectors may process chunks in young generation 203 differently than chunks in tenured generation 204. In particular, the write barriers imposed on the aged-out chunks prevent the position of pointers from changing. As such, these roots may be scanned outside of an STW pause during program runtime. The chunks in the young generation may be scanned during an STW pause. However, the number of continuation stacks that are scanned may be significantly reduced. Further, many concurrent and generational garbage collectors scan young generation objects as a matter of course; therefore, locating the pointers in the young generation chunks may be done with little to no overhead.

Figure 8:
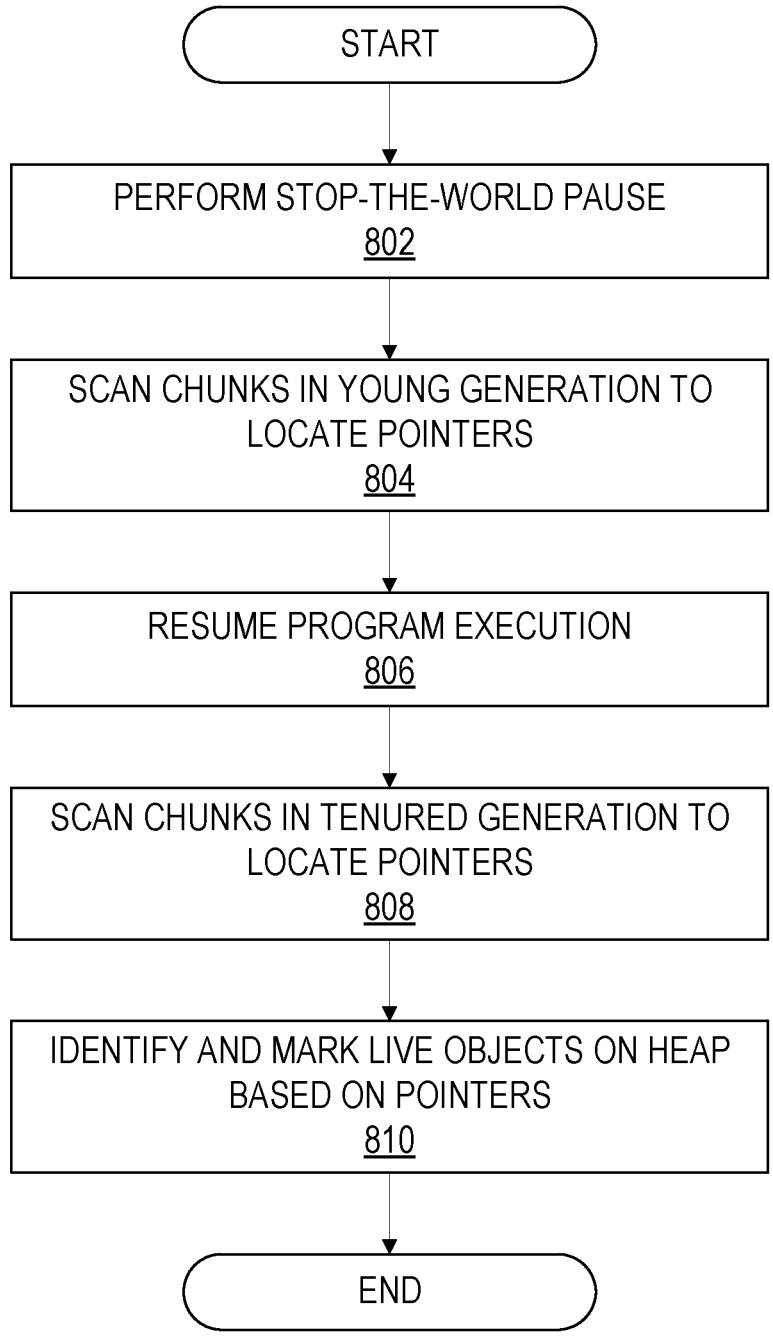
FIG. 8 illustrates an example set of operations for performing garbage collection when chunks are stored in memory in accordance with some embodiments.

FIG. 8 illustrates an example set of operations for performing garbage collection when chunks are stored in memory in accordance with some embodiments. One or more operations illustrated in FIG. 8 may be modified, rearranged, or omitted all together. Accordingly, the particular sequence of operations illustrated in FIG. 8 should not be construed as limiting the scope of one or more embodiments.

Referring to FIG. 8, runtime environment 113 performs an STW pause (operation 802). Thus, all application threads being executed by runtime environment 113 are paused, which prevents the threads from mutating frames in young generation 203.

Runtime environment 113 next scans chunks within young generation 203 to locate pointers (operation 804). In some embodiments, runtime environment 113 parses the stack portion stored in each young generation chunk to track the references. For example, runtime environment 113 may read the metadata stored in the stack frames, including the frames' return addresses, to obtain other metadata used to locate the pointers. The other metadata may include a stack map which identifies object references with the stack frames. Runtime environment 113 may also scan, concurrently or sequentially, thread stacks in the same manner to locate the pointers for currently mounted continuations.

Once the pointers have been identified, runtime environment resumes program execution (operation 806). Thus, all application threads, including continuations mounted thereto, may continue to run, updating stack frames in the thread stacks. It is noted that continuations may also yield during runtime, potentially mutating chunks in young generation 203. In other embodiments, one or more of operation 804 and/or 806 may occur outside of a STW pause during garbage collection. As previously mentioned, garbage collection techniques may vary depending on the programming language and runtime environment of the system executing the program code.

Runtime environment 113 further scans chunks in tenured generation 204 to locate the pointers (operation 808). The chunks may be parsed in the same manner previously described to obtain a stack map of object references within the stack frames. The position of pointers for chunks in tenured generation 204 are frozen, allowing this operation to be performed while the application threads are executing without corrupting the garbage collection process.

Runtime environment 113 further identifies and marks live objects on the heap based on the pointers extracted from the chunks (operation 810). Example marking methods include, but are not limited to, tri-color marking, although other marking techniques may be used, depending on the particular implementation. Marking involves identifying which objects are reachable from the roots, which include the continuation stacks, and marking these objects as live. These objects may be identified by traversing references from the pointers extracted from the root continuation chunks. Objects that are not reachable from the roots may then be collected to reclaim memory consumed by the unused objects.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Implementations

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates computer system 900 upon which an embodiment of the invention may be implemented. Computer system 900 includes bus 902 or other communication mechanism for communicating information, and a hardware processor 904 coupled with bus 902 for processing information. Hardware processor 904 may be, for example, a general purpose microprocessor.

Computer system 900 also includes main memory 906, such as a RAM or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes read only memory (ROM) 908 or other static storage device coupled to bus 902 for storing static information and instructions for processor 904. Storage device 910, such as a magnetic disk or optical disk, is provided and coupled to bus 902 for storing information and instructions.

Computer system 900 may be coupled via bus 902 to display 912, such as a cathode ray tube (CRT) or light emitting diode (LED) monitor, for displaying information to a computer user. Input device 914, which may include alphanumeric and other keys, is coupled to bus 902 for communicating information and command selections to processor 904. Another type of user input device is cursor control 916, such as a mouse, a trackball, touchscreen, or cursor direction keys for communicating direction information and command selections to processor 904 and for controlling cursor movement on display 912. Input device 914 typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 900 can receive the data on the network line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause:
    copying at least a first portion of a continuation stack from a thread stack to a first object in memory upon a first yield of the continuation stack;
    copying, upon a mount of the continuation stack, at least a second portion of the continuation stack from the first object to the thread stack;
    modifying at least the second portion of the continuation stack on the thread stack;
    determining, upon a second yield of the continuation stack based at least in part on whether the first object in memory is subject to a garbage collection barrier, whether to copy the modified second portion of the continuation stack to the first object in memory or to a second object in memory; and
    responsive to determining upon the second yield of the continuation stack that the first object in memory is subject to the garbage collection barrier, copying the modified second portion of the continuation stack to the second object in memory, wherein the garbage collection barrier prevents pointers in the first object from changing position.

2. The media of claim 1, wherein the second object is stored in an area within memory that is not subject to the garbage collection barrier and the instructions further cause: copying at least one updated frame of the continuation stack to the second object responsive to determining that the second object is stored in an area within memory that is not subject to the garbage collection barrier.

3. The media of claim 2, wherein copying the at least one updated frame of the continuation stack to the second object mutates the second object causing a position of at least one pointer in the second object to be changed.

4. The media of claim 1, wherein the first portion of the stack is stored in an equivalent representation within the first object in memory and the thread stack.

5. The media of claim 4, wherein the first portion of the stack includes one or more stack frames.

6. The media of claim 1, wherein the garbage collection barrier allows the pointers in the first object to be deleted.

7. The media of claim 1, wherein the instructions further cause: moving the first object from a first area in memory that is not subject to the garbage collection barrier to a second area in memory that is subject to the garbage collection barrier responsive to determining that the first object has aged out of the first area in memory.

8. The media of claim 1, wherein the instructions further cause: performing a stop the world pause of a program; during the stop the world pause, identifying a first set of pointers in one or more continuation objects that are in a first memory area that is not subject to the garbage collection barrier; after the stop the world pause, identifying a second set of pointers in one or more continuation objects that are in a second memory area that is subject to the garbage collection barrier; and identifying live objects based on the first set of pointers and the second set of pointers.

9. A method comprising:
    copying at least a first portion of a continuation stack from a thread stack to a first object in memory upon a first yield of the continuation stack;
    copying, upon a mount of the continuation stack, at least a second portion of the continuation stack from the first object to the thread stack;
    modifying at least the second portion of the continuation stack on the thread stack;
    determining, upon a second yield of the continuation stack based at least in part on whether the first object in memory is subject to a garbage collection barrier, whether to copy the modified second portion of the continuation stack to the first object in memory or to a second object in memory; and
    responsive to determining upon the second yield of the continuation stack that the first object in memory is subject to the garbage collection barrier, copying the modified second portion of the continuation stack to the second object in memory, wherein the garbage collection barrier prevents pointers in the first object from changing position.

10. The method of claim 9, wherein the second object is stored in an area within memory that is not subject to the garbage collection barrier, the method further comprising: copying at least one updated frame of the continuation stack to the second object responsive to determining that the second object is stored in an area within memory that is not subject to the garbage collection barrier.

11. The method of claim 10, wherein copying the at least one updated frame of the continuation stack to the second object mutates the second object causing a position of at least one pointer in the second object to be changed.

12. The method of claim 9, wherein the first portion of the stack is stored in an equivalent representation within the first object in memory and the thread stack.

13. The method of claim 12, wherein the first portion of the stack includes one or more stack frames.

14. The method of claim 9, wherein the garbage collection barrier allows the pointers in the first object to be deleted.

15. The method of claim 9, further comprising: moving the first object from a first area in memory that is not subject to the garbage collection barrier to a second area in memory that is subject to the garbage collection barrier responsive to determining that the first object has aged out of the first area in memory.

16. The method of claim 9, further comprising: performing a stop the world pause of a program; during the stop the world pause, identifying a first set of pointers in one or more continuation objects that are in a first memory area that is not subject to the garbage collection barrier; after the stop the world pause, identifying a second set of pointers in one or more continuation objects that are in a second memory area that is subject to the garbage collection barrier; and identifying live objects based on the first set of pointers and the second set of pointers.

17. A system comprising:
one or more hardware processors;
one or more non-transitory computer-readable media storing instructions which, when executed by the one or more hardware processors, cause the system to perform operations comprising:
copying at least a first portion of a continuation stack from a thread stack to a first object in memory upon a first yield of the continuation stack;
copying, upon a mount of the continuation stack, at least a second portion of the continuation stack from the first object to the thread stack;
modifying at least the second portion of the continuation stack on the thread stack;
determining, upon a second yield of the continuation stack based at least in part on whether the first object in memory is subject to a garbage collection barrier, whether to copy the modified second portion of the continuation stack to the first object in memory or to a second object in memory; and
responsive to determining upon the second yield of the continuation stack that the first object in memory is subject to the garbage collection barrier, copying the modified second portion of the continuation stack to the second object in memory, wherein the garbage collection barrier prevents pointers in the first object from changing position.

18. The system of claim 17, wherein the second object is stored in an area within memory that is not subject to the garbage collection barrier and the instructions further cause: copying at least one updated frame of the continuation stack to the second object responsive to determining that the second object is stored in an area within memory that is not subject to the garbage collection barrier.

19. The system of claim 18, wherein copying the at least one updated frame of the continuation stack to the second object mutates the second object causing a position of at least one pointer in the second object to be changed.

20. The system of claim 17, wherein the first portion of the stack is stored in an equivalent representation within the first object in memory and the thread stack.

* * * * *

UNITED STATES PATENT AND TRADEMARK OFFICE
CERTIFICATE OF CORRECTION

| | | |
|---|---|---|
| PATENT NO. | : 11,604,729 B2 | Page 1 of 1 |
| APPLICATION NO. | : 16/906879 | |
| DATED | : March 14, 2023 | |
| INVENTOR(S) | : Pressler et al. | |

It is certified that error appears in the above-identified patent and that said Letters Patent is hereby corrected as shown below:

In the Specification

In Column 2, Line 29, delete "General Overview" and insert -- GENERAL OVERVIEW --, therefor.

In Column 8, Line 7, before "new" delete "e 111", therefor.

Signed and Sealed this
Second Day of January, 2024

Katherine Kelly Vidal
*Director of the United States Patent and Trademark Office*